US011708455B2

(12) United States Patent
Huang et al.

(10) Patent No.: US 11,708,455 B2
(45) Date of Patent: Jul. 25, 2023

(54) FLAME-RETARDANT POLYCARBONATE COMPOSITION

(71) Applicant: Covestro Deutschland AG, Leverkusen (DE)

(72) Inventors: Zhenyu Huang, Shanghai (CN); Hao Han, Shanghai (CN)

(73) Assignee: Covestro Deutschland AG, Leverkusen (DE)

(*) Notice: Subject to any disclaimer, the term of this patent is extended or adjusted under 35 U.S.C. 154(b) by 0 days.

(21) Appl. No.: 17/997,748

(22) PCT Filed: May 14, 2021

(86) PCT No.: PCT/EP2021/062804
§ 371 (c)(1),
(2) Date: Nov. 2, 2022

(87) PCT Pub. No.: WO2021/233773
PCT Pub. Date: Nov. 25, 2021

(65) Prior Publication Data
US 2023/0125361 A1    Apr. 27, 2023

(30) Foreign Application Priority Data

May 22, 2020   (WO) ................ PCT/CN2020/091732
Jun. 8, 2020   (EP) ..................................... 20178644

(51) Int. Cl.
C08F 14/26      (2006.01)
C08F 220/14     (2006.01)
C08F 265/06     (2006.01)
C08K 5/5399     (2006.01)
C08G 64/04      (2006.01)
C08G 64/18      (2006.01)
C08F 220/18     (2006.01)
C08F 230/08     (2006.01)
C08K 3/34       (2006.01)

(52) U.S. Cl.
CPC .............. C08G 64/04 (2013.01); C08F 14/26 (2013.01); C08F 220/14 (2013.01); C08F 220/1804 (2020.02); C08F 230/085 (2020.02); C08F 265/06 (2013.01); C08G 64/186 (2013.01); C08K 3/346 (2013.01); C08K 5/5399 (2013.01)

(58) Field of Classification Search
CPC ............ C08F 220/1804; C08F 230/085; C08F 14/26; C08F 220/14; C08F 265/06; C08K 3/346; C08K 5/5399; C08G 64/186; C08G 64/04
USPC ...................................................... 524/116
See application file for complete search history.

(56) References Cited

U.S. PATENT DOCUMENTS

| | | |
|---|---|---|
| 2,393,967 A | 2/1946 | Brubaker |
| 2,891,920 A | 6/1959 | Hyde et al. |
| 3,189,662 A | 6/1965 | Vaughn, Jr. |
| 3,294,725 A | 12/1966 | Findlay et al. |
| 3,419,634 A | 12/1968 | Vaughn, Jr. |
| 3,553,167 A | 1/1971 | Hermann et al. |
| 3,671,487 A | 6/1972 | Visvaldis |
| 3,723,373 A | 3/1973 | Lucas |
| 3,838,092 A | 9/1974 | Vogt et al. |
| 4,075,173 A | 2/1978 | Maruyama et al. |
| 4,311,823 A | 1/1982 | Imai et al. |
| 4,334,053 A | 6/1982 | Freitag et al. |
| 4,584,360 A | 4/1986 | Paul et al. |
| 4,806,593 A | 2/1989 | Kress et al. |
| 4,877,831 A | 10/1989 | Hongo et al. |
| 4,888,388 A | 12/1989 | Hongo et al. |
| 5,227,449 A | 7/1993 | Odell et al. |
| 5,414,054 A | 5/1995 | Simon et al. |
| 5,807,914 A | 9/1998 | Obayashi et al. |
| 5,821,321 A | 10/1998 | Archey et al. |
| 6,093,759 A | 7/2000 | Gareiss et al. |
| 7,332,105 B2 | 2/2008 | Braig et al. |
| 8,044,122 B2 | 10/2011 | Ruediger et al. |

(Continued)

FOREIGN PATENT DOCUMENTS

| | | |
|---|---|---|
| DE | 2232877 A1 | 1/1974 |
| DE | 2714544 A1 | 10/1977 |

(Continued)

OTHER PUBLICATIONS

Schnell, H., Chemistry and Physics of Polycarbonates, Interscience Publishers, New York 1964, p. 28 ff.
Schildknecht, C.E., "Vinyl and Related Polymers", John Wiley &Sons, Inc., New York, 1962, pp. 484-494.
Wall, "Fluoropolymers", Wiley-Interscience, John Wiley &Sons, Inc., New York, vol. 13, 1970, pp. 623-654.
"Modern Plastics Encyclopedia", 1970-1971, vol. 47, No. 10 A, Oct. 1970, McGraw-Hill, Inc., New York, pp. 134 and 774.

(Continued)

Primary Examiner — Kelechi C Egwim
(74) Attorney, Agent, or Firm — John E. Mrozinski, Jr.

(57) ABSTRACT

The present invention relates to a flame-retardant polycarbonate composition comprising the following components, relative to the total weight of the composition:
A) 30-70 wt. % of at least one aromatic polycarbonate,
B) 20-60 wt. % of at least one polysiloxane-polycarbonate block condensate,
C) 0.5-5 wt. % of at least one cyclic phosphazene,
D) 1-5 wt. % of at least one silicone-acrylate rubber based impact modifier,
E) 0.3-3 wt % of kaolin,
F) 0.1-1 wt. % of at least one anti-dripping agent, and
G) 0.1-1 wt. % of at least one UV absorber.

The present invention also relates to a shaped article produced from the composition. The polycarbonate composition according to the present invention has a good combination of low-temperature impact performance, flame-retardancy, hydrolytic stability, anti-UV performance, and heat resistance.

13 Claims, No Drawings

(56) References Cited

U.S. PATENT DOCUMENTS

| | | | |
|---|---|---|---|
| 2003/0139504 A1 | 7/2003 | Miebach et al. | |
| 2007/0072960 A1 | 3/2007 | Ma et al. | |
| 2013/0267665 A1 | 10/2013 | Huggins et al. | |
| 2013/0313493 A1* | 11/2013 | Wen | C08L 69/005 252/601 |
| 2016/0194495 A1 | 7/2016 | Li et al. | |

FOREIGN PATENT DOCUMENTS

| | | |
|---|---|---|
| DE | 3007934 A1 | 9/1981 |
| DE | 3832396 A1 | 2/1990 |
| DE | 10311063 A1 | 9/2004 |
| EP | 0122535 A2 | 10/1984 |
| EP | 0728811 A2 | 8/1996 |

OTHER PUBLICATIONS

"Modern Plastics Encyclopedia", 1975-1976, Oct. 1975, vol. 52, No. 10 A, McGraw-Hill, Inc., New York, pp. 27, 28 and 472.
Legrand, D. G. and Bendler, J. T. Bendler, Handbook of Polycarbonate Science and Technology, Marcel Dekker New York 2000, p. 72 ff.
International Search Report, PCT/EP2021/062804, dated Jul. 23, 2021, Authorized officer: Pierre Dalet.

* cited by examiner

FLAME-RETARDANT POLYCARBONATE COMPOSITION

TECHNICAL FIELD

The present invention belongs to the polycarbonate field. In particular, the present invention relates to a flame-retardant polycarbonate composition, and a shaped article produced from the same.

BACKGROUND ART

There are high requirements on the plastic housing materials for outdoor applications facing the harsh conditions from environments such as extreme high or low temperature, high humidity, and fire risk etc. In most cases, good low-temperature impact performance, good hydrolytic stability, good anti-UV performance, high flame-retardancy, and high heat resistance are required for these materials.

Polycarbonate (PC) resins show high heat resistance and good impact performance at room temperature. But at low temperature like below 0° C. or even lower, PC resins are sensitive to small defects and residual internal stress, therefore cannot resist big external impact. In order to improve the low-temperature impact strength, impact modifiers (mostly having a core-shell structure with rubber core and grafted chain) are usually compounded with polycarbonate feedstocks. However, some residual acids, emulsion agents and metal ions will be harmful to the hydrolytic stability of polycarbonate compounds. In addition, a high amount of impact modifiers also lead to reduced flame-retardant performance. The addition of flame-retardant agents such as traditional phosphorus flame-retardant agents (Bisphenol-A bis(diphenyl phosphate (BDP), tetraphenyl resorcinol diphosphate (RDP) etc.) tends to improve the flame-retardancy, but the impact performance, the heat resistance and the hydrolytic stability will be sacrificed.

Polysiloxane-polycarbonate copolymers (Si-co-PC) have been a good candidate to replace traditional core-shell structure impact modifiers to give good low-temperature impact performance and at the same time do not have negative impact on the flame-retardancy. However, most Si-co-PC resins available in the market have low siloxane content (<10%) and are not able to provide good low-temperature impact strength alone.

Therefore, it is a big challenge to achieve the balance among low-temperature impact performance, flame-retardancy, hydrolytic stability, anti-UV performance, and heat resistance for polycarbonate compounds for outdoor applications.

WO2015022676A discloses blended thermoplastic compositions comprising at least one polycarbonate component, at least one impact modifier, at least one mineral filler, and at least one flame retardant, the resulting compositions can be used in the manufacture of articles requiring materials with high modulus, ultra-high ductility, good flow, thin wall flame retardancy and good thermal resistance. All examples in this document comprise 15% of mineral filler. Poor low temperature impact performance and low heat resistance are expected for the materials with this composition.

WO2003/042305A1 discloses flame retardant resinous compositions comprising (i) at least one aromatic polycarbonate, (ii) at least one silicone source, (iii) at least one boron source, and (iv) optionally at least one member selected from the group consisting of an anti-dripping agent, a second thermoplastic resin which is not a polycarbonate resin, and a rubber modified graft copolymer. Boron compounds used therein might have negative impact on thermal stability and hydrolytic stability of the compositions.

WO2007/037952A1 discloses a flame retardant thermoplastic composition comprising in combination a polycarbonate component; an impact modifier; a filler having a surface treatment, the surface treatment comprising pretreating or mixing the filler with a vinyl functionalized silane coupling agent; a polycarbonate-polysiloxane copolymer and a flame retardant. All examples in this document comprise 10% of filler and BDP is used as a flame retardant. Poor low temperature impact performance and low heat resistance are expected for the materials with this composition.

Thus, there is still a need to provide a polycarbonate composition which has a good combination of low-temperature impact performance, flame-retardancy, hydrolytic stability, anti-UV performance, and heat resistance.

SUMMARY OF THE INVENTION

One object of the present application is to provide a polycarbonate composition which has a good combination of low-temperature impact performance, flame-retardancy, hydrolytic stability, anti-UV performance, and heat resistance.

Therefore, according to a first aspect, the present invention provides a flame-retardant polycarbonate composition comprising the following components, relative to the total weight of the composition:
A) 30-70 wt. % of at least one aromatic polycarbonate,
B) 20-60 wt. % of at least one polysiloxane-polycarbonate copolymer,
C) 0.5-5 wt. % of at least one cyclic phosphazene,
D) 1-5 wt. % of at least one silicone-acrylate rubber based impact modifier,
E) 0.3-3 wt. % of kaolin,
F) 0.1-1 wt. % of at least one anti-dripping agent, and
G) 0.1-1 wt. % of at least one UV absorber.

According to a second aspect, the present invention provides a shaped article made from the polycarbonate composition according to the first aspect of the present invention.

According to a third aspect, the present invention provides a process for preparing the shaped article according to the second aspect of the present invention, comprising injection moulding, extrusion moulding, blowing moulding or thermoforming the polycarbonate composition according to the first aspect of the present invention.

The polycarbonate composition and the shaped article according to the present invention have good flame-retardancy, excellent low-temperature impact-resistance, good heat resistance and good hydrolytic stability.

The polycarbonate composition and the shaped article according to the present invention are suitable for outdoor applications which require relatively high flame-retardancy (such as UL94 5 VB), good hydrolytic stability and excellent low-temperature impact strength, such as network antenna, electric vehicle charging gun closure, photovoltaic connection box, electrical scooter battery housing, etc.

Other subjects and characteristics, aspects and advantages of the present invention will emerge even more clearly on reading the description and the examples that follows.

DETAILED DESCRIPTION OF THE INVENTION

In that which follows and unless otherwise indicated, the limits of a range of values are included within this range, in particular in the expressions "between . . . and . . . " and "from . . . to . . . ".

As used herein, the expression "comprising" is to be interpreted as encompassing all specifically mentioned features as well optional, additional, unspecified ones.

As used herein, the expression "at least one" means one or more.

Unless defined otherwise, all technical and scientific terms used herein have the same meaning as commonly understood by one of ordinary skill in the art to which the present invention pertains. When the definition of a term in the present description conflicts with the meaning as commonly understood by those skilled in the art the present invention belongs to, the definition described herein shall apply.

Unless otherwise specified, all numerical values expressing amount of ingredients and the like which are used in the description and claims are to be understood as being modified by the term "about".

All percentages in the present application refer to weight percentage, unless otherwise specified.

Technical features described for each component in the composition according to the present invention can combined in any way on the provision that there is no conflict.

Component A

According to the first aspect, the polycarbonate composition according to the present invention comprises at least one aromatic polycarbonate as component A.

Aromatic polycarbonates that are suitable according to the invention as component A are known in the literature or can be prepared by processes known in the literature (for the preparation of aromatic polycarbonates see e.g. Schnell, "Chemistry and Physics of Polycarbonates", Interscience Publishers, 1964, and DE-AS 1 495 626, DE-A 2 232 877, DE-A 2 703 376, DE-A 2 714 544, DE-A 3 000 610, DE-A 3 832 396; and DE-A 3 007 934).

Aromatic polycarbonates are prepared e.g. by reacting diphenols with carbonic acid halides, preferably phosgene, and/or with aromatic dicarboxylic acid dihalides, preferably benzenedicarboxylic acid dihalides, by the phase interface process, optionally using chain terminators, e.g. monophenols, and optionally using trifunctional or more than trifunctional branching agents, e.g. triphenols or tetraphenols. They can also be prepared by reacting diphenols with e.g. diphenyl carbonate by a melt polymerization process.

Diphenols for the preparation of the aromatic polycarbonates are preferably those of formula (I):

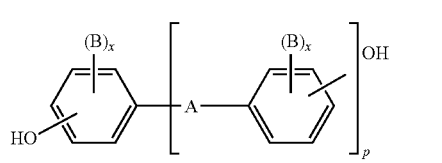

wherein

A is a single bond, $C_1$-$C_5$-alkylene, $C_2$-$C_5$-alkylidene, $C_5$-$C_6$-cycloalkylidene, —O—, —SO—, —CO—, —S—, —$SO_2$—, $C_6$-$C_{12}$-arylene to which further aromatic rings optionally containing heteroatoms can be fused, or a radical of formula (II) or (III):

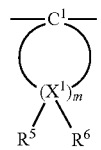

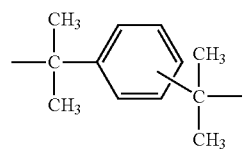

B is in each case $C_1$-$C_{12}$-alkyl, preferably methyl, or halogen, preferably chlorine and/or bromine, x independently of one another is in each case 0, 1 or 2, p is 1 or 0, and $R^5$ and $R^6$ can be individually chosen for each $X^1$ and independently of one another are hydrogen or $C_1$-$C_6$-alkyl, preferably hydrogen, methyl or ethyl, $X^1$ is carbon, and m is an integer from 4 to 7, preferably 4 or 5, with the proviso that $R^5$ and $R^6$ are simultaneously alkyl on at least one atom $X^1$.

Preferred diphenols are hydroquinone, resorcinol, dihydroxydiphenols, bis(hydroxy-phenyl)-$C_1$-$C_5$-alkanes, bis(hydroxyphenyl)-$C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl)diisopropylbenzenes, and their ring-brominated and/or ring-chlorinated derivatives.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone and their di- and tetrabrominated or chlorinated derivatives, e.g. 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is particularly preferred.

The diphenols can be used individually or as any desired mixtures. The diphenols are known in the literature or obtainable by processes known in the literature.

Examples of suitable chain terminators for the preparation of the thermoplastic aromatic polycarbonates are phenol, p-chlorophenol, p-tert-butylphenol or 2,4,6-tribromophenol, as well as long-chain alkylphenols such as 4-[2-(2,4,4-trimethyl-pentyl)]phenol and 4-(1,3-tetramethylbutyl)phenol according to DE-A 2 842 005, or monoalkylphenols or dialkylphenols having a total of 8 to 20 carbon atoms in the alkyl substituents, such as 3,5-ditert-butylphenol, p-isooctylphenol, p-tert-octylphenol, p-dodecylphenol, 2-(3,5-dimethylheptyl)phenol and 4-(3,5-dimethylheptyl)phenol. The amount of chain terminators to be used is generally between 0.5 mol % and 10 mol %, based on the molar sum of the particular diphenols used.

The thermoplastic aromatic polycarbonates can be branched in known manner, preferably by the incorporation of 0.05 to 2.0 mol %, based on the sum of the diphenols used, of trifunctional or more than trifunctional compounds, e.g. those with three or more phenolic groups.

Both homopolycarbonates and copolycarbonates are suitable. In the case where a copolycarbonate is used as component A, the copolycarbonate is different from the polysiloxane-polycarbonate copolymer used as component B as described in detail hereinafter.

Aromatic dicarboxylic acid dihalides for the preparation of aromatic polycarbonates are preferably the diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of between 1:20 and 20:1 are particularly preferred.

A carbonic acid halide, preferably phosgene, is additionally used concomitantly as a difunctional acid derivative in the preparation of polycarbonates.

Suitable chain terminators for the preparation of the aromatic polycarbonates, apart from the monophenols already mentioned, are their chlorocarbonic acid esters and the acid chlorides of aromatic monocarboxylic acids which can optionally be substituted by $C_1$-$C_{22}$-alkyl groups or halogen atoms, as well as aliphatic $C_2$-$C_{22}$-monocarboxylic acid chlorides.

The amount of chain terminators is 0.1 to 10 mol % in each case, based on moles of diphenol for phenolic chain terminators and on moles of dicarboxylic acid dichloride for monocarboxylic acid chloride chain terminators.

One or more aromatic hydroxycarboxylic acids can additionally be used in the preparation of aromatic polycarbonates.

The aromatic polycarbonates can be both linear and branched in known manner (cf. DE-A 2 940 024 and DE-A 3 007 934 in this connection), linear polycarbonates being preferred.

Examples of branching agents which can be used are trifunctional or more than trifunctional carboxylic acid chlorides such as trimesic acid trichloride, cyanuric acid trichloride, benzophenone-3,3',4,4'-tetracarboxylic acid tetrachloride, naphthalene-1,4,5,8-tetracarboxylic acid tetrachloride or pyromellitic acid tetrachloride, in amounts of 0.01 to 1.0 mol % (based on the dicarboxylic acid dichlorides used), or trifunctional or more than trifunctional phenols such as phloroglucinol, 4,6-dimethyl-2,4,6-tri(4-hydroxyphenyl)-2-heptene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy) methane or 1,4-bis[4,4'-(dihydroxytriphenyl)methyl]benzene, in amounts of 0.05 to 2.0 mol %, based on the diphenols used. Phenolic branching agents can be used with the diphenols; acid chloride branching agents can be introduced together with the acid dichlorides.

The proportion of carbonate structural units in the thermoplastic aromatic polycarbonates can vary freely. The proportion of carbonate groups is preferably up to 100 mol %, especially up to 80 mol % and particularly preferably up to 50 mol %, based on the sum of the ester groups and carbonate groups. Both the ester part and the carbonate part of the aromatic polycarbonates can be present in the polycondensation product in the form of blocks or as a random distribution.

The polycarbonates used are preferably linear and more preferably based on bisphenol A.

Preferably, the aromatic polycarbonates have weight-average molecular weights ($M_w$, measured by GPC (gel permeation chromatography in methylene chloride using a bisphenol A-based polycarbonate as a standard)) of 15,000 to 80,000 g/mol, preferably of 20,000 to 32,000 g/mol, more preferably of 23,000 to 28,000 g/mol and even more preferably of 24,000 to 26,000 g/mol.

As an example of aromatic polycarbonate suitable for the present invention, mention can be made to those sold under the name of Makrolon® 2600, Makrolon® 2400 by Covestro Co., Ltd.

The aromatic polycarbonates can be used on their own or in any desired mixture.

Advantageously, the aromatic polycarbonates is present in the polycarbonate composition in an amount ranging from 35 wt. % to 70 wt. %, preferably from 35 wt. % to 66 wt. %, relative to the total weight of the polycarbonate composition.

Component B

According to the first aspect, the polycarbonate composition according to the present invention comprises at least one polysiloxane-polycarbonate block copolymer (also named as "SicoPC" in the context of the present application) as component B.

The polysiloxane-polycarbonate copolymer comprises polydiorganosiloxane (also named as "siloxane" in the context of the present application) blocks and polycarbonate blocks.

In particular, the polysiloxane-polycarbonate copolymer comprises structural unit (IV)

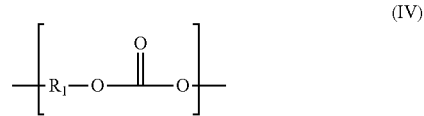

wherein $R_1$ is a divalent substituted or unsubstituted aromatic radical, a divalent linear or cyclic aliphatic radical, or the structural unit (IV) is a mixture of units, wherein $R_1$ is a divalent substituted or unsubstituted aromatic radical or $R_1$ is a divalent linear or cyclic aliphatic radical and the proportion of aromatic $R_1$ radicals is 60-100 wt. % and the proportion of aliphatic radicals is 0-40 wt. % based on the sum of the employed diphenols of the formula (I') mentioned below in % by weight, and structural unit (V)

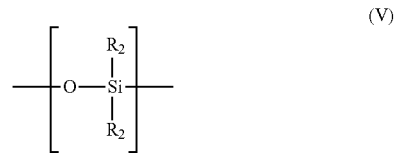

wherein $R_2$ is independently at each occurrence a $C_1$-$C_{13}$ monovalent organic group, for example, $C_1$-$C_{13}$ alkyl, $C_1$-$C_{13}$ alkoxy, a $C_2$-$C_{13}$ alkenyl group, $C_2$-$C_{13}$ alkenyloxy, $C_3$-$C_6$ cycloalkyl, optionally fully or partly halogenated by fluorine, chlorine, bromine or iodine or combinations thereof.

Preferably $R_2$ is independently at each occurrence $C_1$-$C_{12}$ alkyl, particularly preferably $C_1$-$C_4$ alkyl, especially methyl, or phenyl.

Very particularly preferred structural units (V) are dimethylsiloxane units, or diphenylsiloxane units, methyl/phenylsiloxane units or mixtures of dimethylsiloxane and diphenylsiloxane units.

Component B preferably contains 2 wt. % to 20 wt. %, preferably 3 wt. % to 10 wt. %, of structural units of formula (V), hereinbelow also referred to as siloxane blocks, based on the weight of component B.

In the structural unit (IV) $R_1$ is preferably derived from dihydroxyaryl compounds of formula (I')

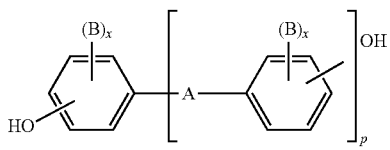
(I')

A is a single bond, $C_1$-$C_5$-alkylene, $C_2$-$C_5$-alkylidene, $C_5$-$C_6$-cycloalkylidene, —O—, —SO—, —CO—, —S—, —SO$_2$—, $C_6$-$C_{12}$-arylene to which further aromatic rings optionally containing heteroatoms can be fused, or a radical of formula (II') or (III'):

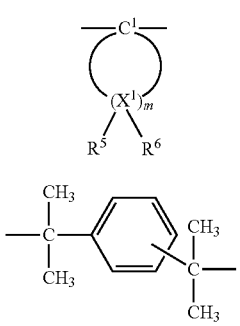

B is in each case $C_1$-$C_{12}$-alkyl, preferably methyl, or halogen, preferably chlorine and/or bromine, x independently of one another is in each case 0, 1 or 2, p is 1 or 0, and $R^5$ and $R^6$ can be individually chosen for each $X^1$ and independently of one another are hydrogen or $C_1$-$C_6$-alkyl, preferably hydrogen, methyl or ethyl, $X^1$ is carbon, and m is an integer from 4 to 7, preferably 4 or 5, with the proviso that $R^5$ and $R^6$ are simultaneously alkyl on at least one atom $X^1$.

Examples of diphenols of formula (I') that are suitable for the production of the SiCoPCs according to the invention include hydroquinone, resorcinol, bis(hydroxyphenyl)alkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, [α],[α]'-bis(hydroxyphenyl)diisopropylbenzenes and also the alkylated, ring-alkylated and ring-halogenated compounds thereof.

More preferred diphenols of formula (I') are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,2-bis(3-methyl-4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclohexane and 1,1-bis(4-hydroxyphenyl)-3,3,5-trimethylcyclohexane.

Particularly preferred diphenols of formula (I') are 2,2-bis(4-hydroxyphenyl)propane (BPA), hydroquinone, 1,1-bis(4-hydroxyphenyl)-3,3,5-trimethylcyclohexane and 2,2-bis(3-methyl-4-hydroxyphenyl)propane.

These and further suitable diphenols are commercially available and described for example in "H. Schnell, Chemistry and Physics of Polycarbonates, Interscience Publishers, New York 1964, p. 28 ff; p. 102 ff", and in "D. G. Legrand, J. T. Bendler, Handbook of Polycarbonate Science and Technology, Marcel Dekker New York 2000, p. 72 ff."

Preferably, the siloxane block has the following structure (VI)

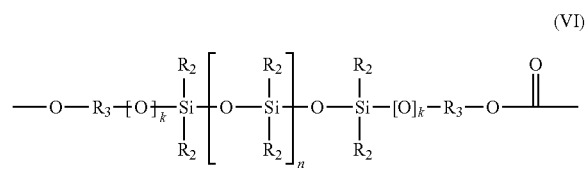
(VI)

wherein $R_2$ is as defined above with respect to structural unit (V), n represents an average number from 10 to 400, preferably 10 to 100, particularly preferably 15 to 50, in each case determined by 1H-NMR spectroscopy, k represents 0 or 1, $R_3$ independently at each occurrence comprises the following structural elements (VII) or (VIII):

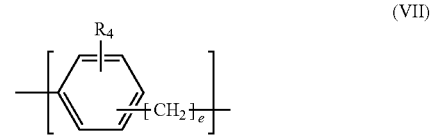
(VII)

wherein $R_4$ is independently at each occurrence hydrogen, halogen and/or a $C_1$-$C_{10}$, preferably $C_1$-$C_4$, linear or branched, unsubstituted or mono- to tetrasubstituted alkyl radical or alkoxy radical, wherein the alkyl and alkoxy radicals are preferably unsubstituted, and $R_4$ is especially preferably hydrogen, e is 0 or a natural number from 2 to 12, preferably 2 to 6, wherein, in the case where e is 0, k is 1,

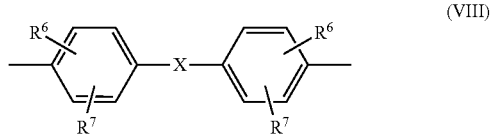
(VIII)

wherein $R^6$ and $R^7$ independently of one another represent H, $C_1$-$C_{18}$-alkyl, $C_1$-$C_{18}$-alkoxy, halogen such as Cl or Br or in each case optionally substituted aryl or aralkyl, preferably independently of one another represent H or $C_1$-$C_{12}$-alkyl, particularly preferably H or $C_1$-$C_8$-alkyl and very particularly preferably independently of one another represent H or methyl, and X represents —CO—, —O—, —S—, $C_1$-$C_6$-alkylene, $C_2$- to $C_5$-alkylidene, $C_6$-$C_{10}$-cycloalkylidene or $C_6$-$C_{12}$-arylene which may optionally be fused to further aromatic rings containing heteroatoms.

It is preferable when X represents $C_1$-$C_5$-alkylene, $C_2$-$C_5$-alkylidene, $C_6$-$C_9$-cyclohexylidene, —O—, —SO—, —CO—, —S—, —$SO_2$—, particularly preferably isopropylidene, 3,3,5-trimethylcyclohexylidene or oxygen, especially isopropylidene.

By way of example and preferably the siloxane block is derived from the structure (IX) or the structure (X):

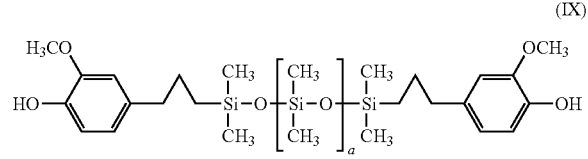
(IX)

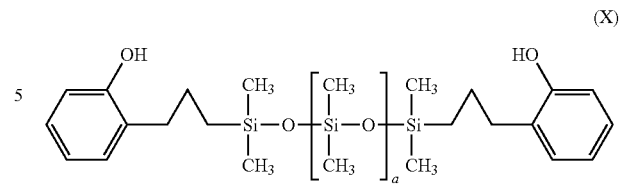
(X)

wherein a in formulae (IX) and (X) represents an average number from 10 to 400, preferably 10 to 100 and particularly preferably 15 to 50 in each case determined by 1H-NMR spectroscopy.

The 1H-NMR spectroscopy of all siloxane blocks shown here and the component B overall may be carried out in deuterated chlorinated solvents, preferably in deuterated chloroform or deuterated dichloromethane. Suitable signals are integrated and compared in each case.

In the structures IX and X, for example, a is determined by using the integral of the $SiCH_3$ protons between 0 and 0.5 ppm chemical shift and the integral of the adjacent $CH_2$ at about 2.6 ppm chemical shift.

In a further embodiment, the abovementioned siloxane blocks may be joined one or more times via terephthalic acid or isophthalic acid to afford the following exemplary structural elements:

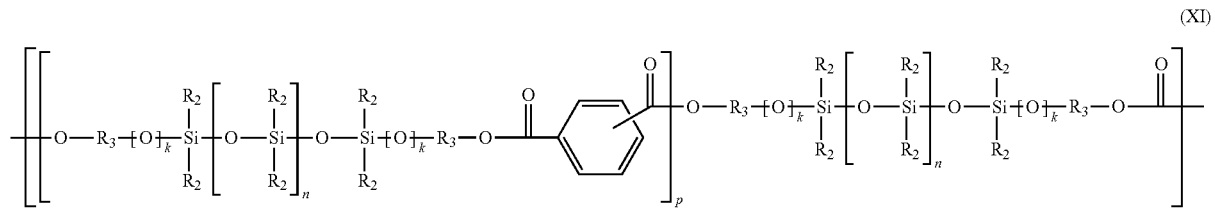
(XI)

wherein p represents 0 or 1,
$R_2$, $R_3$, n and k are as defined above for structural element (VI).

Corresponding siloxane blocks for reaction with polycarbonate or for reaction with diphenols of formula (I') with phosgene or diaryl carbonates each have terminal phenolic OH groups. i.e.

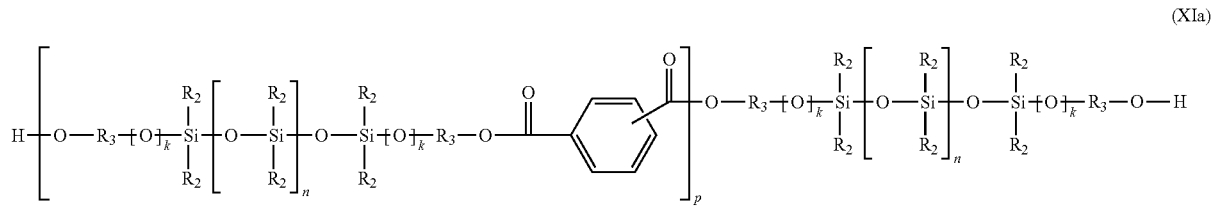
(XIa)

wherein $R_2$, $R_3$, n, k and p are as defined for structural element (XI).

It is especially preferable when the siloxane blocks are hydroxyaryl-terminated (poly)siloxanes of formula (XII)

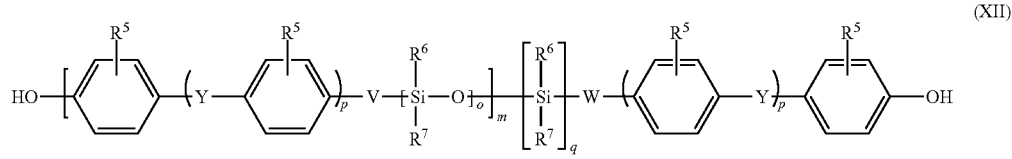

In general formula (XII), $R_5$ represents hydrogen or $C_1$-$C_4$-alkyl, $C_1$-$C_4$-alkoxy, preferably hydrogen or methyl, methyloxy, particularly preferably hydrogen.

$R^6$ and $R^7$ independently of one another represent aryl, preferably phenyl, $C_1$-$C_4$ alkyl, preferably methyl, especially methyl.

Y represents a single bond, —CO—, —O—, $C_1$- to $C_5$-alkylene, $C_2$-$C_5$-alkylidene or a $C_5$-$C_6$-cycloalkylidene radical which may be mono- or polysubstituted by $C_1$-$C_4$-alkyl, preferably a single bond, —O—, isopropylidene or a $C_5$-$C_6$-cycloalkylidene radical which may be mono- or polysubstituted by $C_1$-$C_4$-alkyl, especially isopropylidene.

V represents oxygen, $C_1$-$C_6$ alkylene or $C_2$-$C_5$-alkylidene, preferably a single bond, oxygen, $C_3$ alkylene, especially oxygen or isopropylidene.

W represents a single bond, S, $C_1$-$C_6$-alkylene or $C_2$-$C_5$-alkylidene, preferably a single bond, $C_3$ alkylene or isopropylidene, wherein W is not a single bond when q represents 1.

p and q each independently of one another represent 0 or 1.

o represents an average number of repeating units from 10 to 400, preferably 10 to 100, particularly preferably 15 to 50, in each case determined by 1H-NMR spectroscopy.

o is determined for example using the integral of the central Si—$CH_3$ protons (at about 0.1 ppm chemical shift) in relation to the integral of the two terminal siloxane units of the block, i.e. O—Si($CH_3$)$_2$ (at about 0.2 ppm chemical shift).

m represents an average number of repeating units from 1 to 10, preferably 1 to 6, particularly preferably 1.5 to 5, in each case determined by 1H-NMR spectroscopy.

Very particular preference is given to siloxanes of formulae (XIII) and (XIV)

X represents a single bond, —O—, —SO—, —CO—, —S—, —$SO_2$—, $C_1$-$C_6$-alkylene, $C_2$ alkylidene, $C_5$-$C_{12}$-cycloalkylidene, or $C_6$-$C_{12}$-arylene which my optionally be fused to aromatic rings containing further heteroatoms, preferably represents a single bond, —O—, —SO—, —CO—, —S—, —$SO_2$—, $C_1$-$C_5$-alkylene, $C_2$-$C_5$-alkylidene, $C_5$-$C_{12}$-cycloalkylidene, particularly preferably a single bond, isopropylidene, $C_5$-$C_{12}$ cycloalkylidene or oxygen and very particularly preferably isopropylidene, n represents an average number from 10 to 400, preferably 10 to 100, especially preferably 10 to 50, in each case determined by 1H-NMR spectroscopy, and m represents an average number from 1 to 10, preferably from 1 to 6 and especially preferably from 1.5 to 5, in each case determined by 1H-NMR spectroscopy.

Determination of n in the structures XI, XIII and XIV is carried out as per the method described above for o.

Determination of m employs the integrals of the protons at the terminal phenyl groups, for example at the terminal bisphenol-A-derived units, and the integrals of central phenyl groups, for example at the central bisphenol-A-derived units.

Greatest preference is given to siloxanes of formula XIV since they exhibit a particularly good thermal stability and colour stability.

The weight-average molecular weight Mw of the siloxane component, i.e. of the siloxane block, is preferably 3000 to 20 000 g/mol, determined by gel permeation chromatography and using a BPA (bisphenol A) polycarbonate standard, and especially preferably 3500-15000 g/mol.

Production of the siloxanes of formulae (XII) to (XIV) is described in DE 33 34 782 A1 and DE19710081 for example.

The siloxane component of formula (XII), (XIII) or (XIV) are employed in amounts of 0.5 wt. % to 50 wt. %, preferably of 1 wt. % to 40 wt. %, especially preferably of

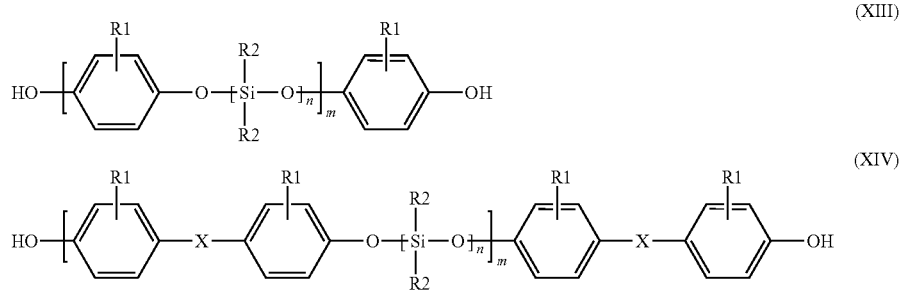

wherein

R1 independently of one another represents hydrogen, Cl, Br, or $C_1$-$C_4$-alkyl, preferably hydrogen or methyl and especially preferably hydrogen, R2 independently of one another represent aryl or $C_1$-$C_{13}$ alkyl, preferably $C_1$-$C_4$-alkyl, 2 wt. % to 20 wt. % and very particularly preferably of 2.5 wt. % to 10 wt. % in each case based on the weight of component B.

The production of the siloxane blocks is known in principle and they can be produced by processes as described, for example, in US20130267665.

The polysiloxane-polycarbonate copolymers are normally industrially produced from the monomers by the interfacial process with phosgene. The production of these polysiloxane-polycarbonate copolymers by the melt transesterification process using diphenol carbonate is also known.

The production of polysiloxane-polycarbonate copolymers by the interfacial process is known from the literature and is described for example in U.S. Pat. Nos. 3,189,662, 3,419,634, DE-A 3 34 782 and EP 0 122 535.

The production of polysiloxane-polycarbonate copolymers by the melt transesterification process from bisphenol, diaryl carbonate, silanol-terminated polysiloxanes and catalyst is described in U.S. Pat. No. 5,227,449.

Reactive extrusion processes for producing polysiloxane-polycarbonate copolymers have also been described. This has been publicized for example in U.S. Pat. Nos. 5,414,054 and 5,821,321.

The polysiloxane-polycarbonate copolymer used according to the invention is preferably produced in a melt transesterification process, more preferably in a reactive extrusion process. The reactive extrusion process preferably comprises mixing and reacting the following components in the melt in an extruder or high viscosity reactor a) at least one polymer-containing structural units of formula (IV), preferably an aromatic polycarbonate b) at least one hydroxylaryl-terminated (poly)siloxane, preferably according to any of formulae IX, X, XIa, XII, XIII, XIV, c) optionally using at least one additive such as for example a catalyst.

The extruder or melt reactor may be a single-screw reactor, a twin-screw reactor or a multi-screw reactor, for example, a planetary roller extruder or a ring extruder. A high-volume kneader reactor may also be concerned.

The process may be carried out in a single apparatus—for example a twin-screw extruder or else in two stages, i.e. a reactor combination. The reactor combination preferably consists of a pre-reactor—such as a twin-screw extruder—and a high-viscosity reactor.

The process is preferably performed at temperatures of 280° C. to 400° C., preferably of 290° C. to 380° C., more preferably of 300° C. to 350° C., and pressures of 0.001 mbar to 50 mbar, preferably 0.005 mbar to 40 mbar, especially preferably 0.02 to 30 mbar and very particularly preferably 0.03 to 5 mbar, preferably in the presence of a catalyst.

Advantageously, the polysiloxane-polycarbonate copolymer is present in the polycarbonate composition according to the present invention in an amount ranging from 25 wt. % to 60 wt. %, preferably from 25 wt. % to 56 wt. %, relative to the total weight of the polycarbonate composition.

Preferably, the total amount of components A and B is no less than 85 wt. %, relative to the total weight of the polycarbonate composition.

Component C

According to the first aspect, the polycarbonate composition according to the present invention comprises at least one cyclic phosphazene as component C.

Cyclic phosphazenes preferably used according to the present invention are cyclic phosphazenes of formula (XV):

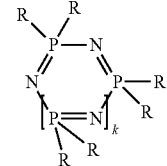

(XV)

wherein k is an integer from 1 to 10, preferably a number from 1 to 8 and particularly preferably 1 to 5, the trimer content (k=1) of from 60 to 100 mol %, based on component C, and wherein R is in each case identical or different and represents an amine radical, $C_1$-$C_8$-alkyl, preferably methyl, ethyl, propyl or butyl, in each case optionally halogenated, preferably with fluorine and more preferably monohalogenated, $C_1$-$C_8$-alkoxy, preferably methoxy, ethoxy, propoxy or butoxy, $C_5$-$C_6$-cycloalkyl in each case optionally substituted by alkyl, preferably $C_1$-$C_4$-alkyl, and/or halogen, preferably chlorine and/or bromine, $C_6$-$C_{20}$-aryloxy, preferably phenoxy or naphthyloxy, in each case optionally substituted by alkyl, preferably $C_1$-$C_4$-alkyl, and/or halogen, preferably chlorine or bromine, and/or hydroxyl, $C_7$-$C_{12}$-aralkyl, preferably phenyl-$C_1$-$C_4$-alkyl, in each case optionally substituted by alkyl, preferably $C_1$-$C_4$-alkyl, and/or halogen, preferably chlorine and/or bromine, a halogen radical, preferably chlorine or fluorine, or an OH radical.

The following are preferred: propoxyphosphazene, phenoxyphosphazene, methylphenoxyphosphazene, aminophosphazene and fluoroalkylphosphazenes, as well as phosphazenes of the following structures:

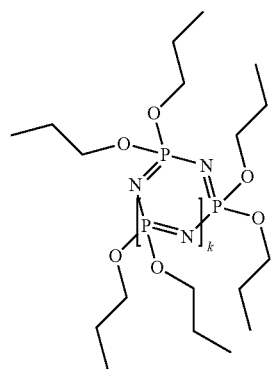

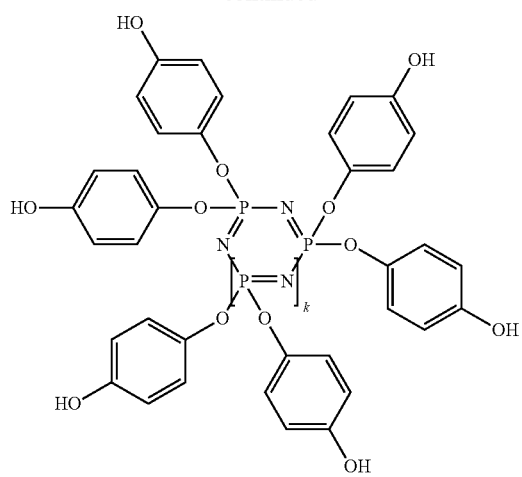

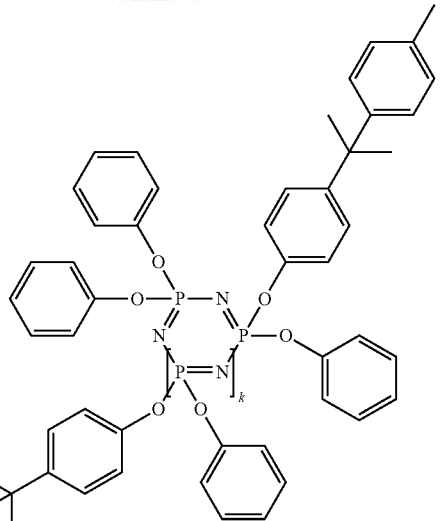

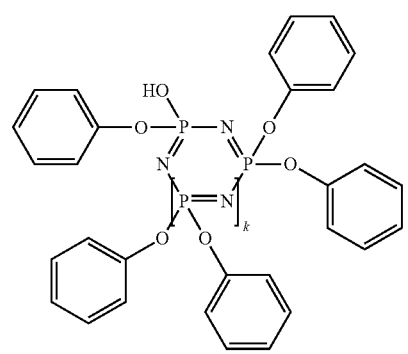

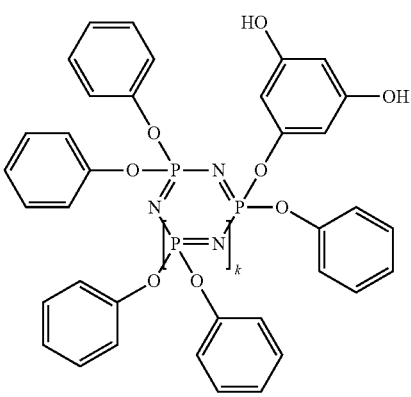

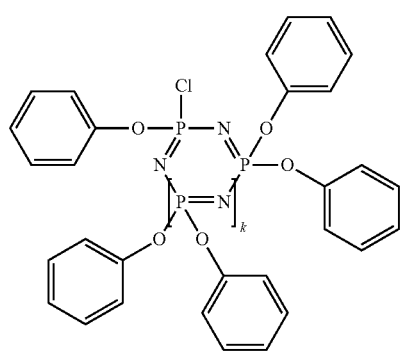

In the compounds shown above, k=1, 2 or 3.

In the case where the phosphazene of formula (XV) is halogen-substituted on the phosphorus, e.g. from incompletely reacted starting material, the proportion of this phosphazene halogen-substituted on the phosphorus is preferably less than 1000 ppm, more preferably less than 500 ppm.

The phosphazenes can be used on their own or as a mixture, i.e. the radicals R can be identical or 2 or more radicals in formula (XV) can be different. Preferably, the radicals R of a phosphazene are identical.

In a more preferred embodiment, only phosphazenes with identical R are used.

Preferably, all R=phenoxy.

The most preferred compound is phenoxyphosphazene of formula (XVI) (all R=phenoxy) with an oligomer content where k=1 (C1) of 65 mol %-100 mol %.

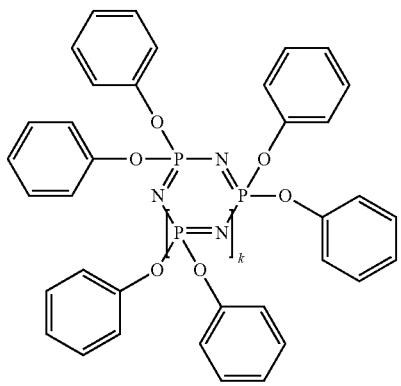

(XVI)

In an embodiment, phenoxyphosphazene of formula (XVI) is used as component C, wherein the trimer content (k=1), based on component C, is from 85 to 100 mol %, more preferably from 98.5 to 100 mol %, even more preferably from 99 to 100 mol %.

The phosphazenes and their preparation are described e.g. in EP-A 728 811, DE-A 1 961 668 and WO 97/40092.

The oligomer compositions of the phosphazenes in the respective blend samples can also be detected and quantified, after compounding, by $^{31}$P-NMR (chemical shift; δ trimer: 6.5 to 10.0 ppm; δ tetramer: −10 to −13.5 ppm; δ higher oligomers: −16.5 to −25.0 ppm).

Advantageously, the cyclic phosphazene is present in the polycarbonate composition in an amount ranging from 1 wt. % to 5 wt. %, preferably from 1.5 wt. % to 4.5 wt. %, relative to the total weight of the polycarbonate composition.

Component D

According to the first aspect, the polycarbonate composition according to the present invention comprises at least one silicone-acrylate rubber based impact modifier as component D.

The silicone-acrylate rubber based impact modifier has a core-shell impact structure.

Preferably, the silicone-acrylate rubber based impact modifier comprises,

D.1) 5 wt. % to 90 wt. %, preferably 8 wt. % to 80 wt. %, in particular 10 wt. % to 70 wt. %, of at least one vinyl monomer on D.2) 95 wt. % to 10 wt. %, preferably 92 wt. % to 20 wt. %, in particular 90 wt. % to 30 wt. %, of one or more silicone-acrylate rubbers as a graft base, the wt. % is calculated based on the weight of the impact modifier.

The vinyl monomers are used to form polymer chains and these are chemically bonded to the graft substrate D.2.

Preferably, the vinyl monomer D.1 is selected from vinylaromatics and/or vinylaromatics substituted on the nucleus (such as styrene, α-methylstyrene, p-methylstyrene), vinyl cyanides (unsaturated nitriles, such as acrylonitrile and methacrylonitrile), (meth)acrylic acid ($C_1$-$C_8$)-alkyl esters, such as methyl methacrylate, ethyl methacrylate, n-butyl acrylate, t-butyl acrylate, and derivatives (such as anhydrides and imides) of unsaturated carboxylic acids, for example maleic anhydride and N-phenylmaleimide.

More preferably, the at least one vinyl monomer D.1 comprises (meth)acrylic acid ($C_1$-$C_8$)-alkyl esters or its combination with styrene, α-methylstyrene or p-methylstyrene.

Preferably, the graft base D.2 may have a glass transition temperatures of <10° C., preferably <0° C., particularly preferably <−20° C. The glass transition temperature was determined by means of dynamic differential calorimetry (DSC) in accordance with the standard DIN EN 61006 at a heating rate of 10 K/min with definition of the $T_g$ as the midpoint temperature (tangent method).

In some embodiments, monomers D.1 is a mixture of

D.1.1) 50 to 99, preferably 60 to 80, especially 70 to 80 parts by weight, based on D.1, of vinylaromatics and/or ring-substituted vinylaromatics (such as styrene, α-methylstyrene, p-methylstyrene, p-chlorostyrene) and/or ($C_1$-$C_5$)-alkyl methacrylates, such as methyl methacrylate, ethyl methacrylate, and D.1.2) 1 to 50, preferably 20 to 40, especially 20 to 30 parts by weight, based on D.1, of ($C_1$-$C_5$)-alkyl (meth)acrylates, such as methyl methacrylate, n-butyl acrylate, tert-butyl acrylate, and/or derivatives (such as anhydrides and imides) of unsaturated carboxylic acids, for example maleic anhydride and N-phenylmaleimide.

Preferred monomers D.1.1 are selected from at least one of the monomers styrene, α-methylstyrene and methyl methacrylate; preferred monomers D.1.2 are selected from at least one of the monomers maleic anhydride and methyl methacrylate. Particularly preferred monomers are D.1.1=D.1.2 methyl methacrylate.

The graft copolymers D are produced by free-radical polymerization, for example by emulsion, suspension, solution or bulk polymerization, preferably by emulsion or bulk polymerization, in particular by emulsion polymerization.

Since, as is well known, the graft monomers are not necessarily completely grafted onto the graft substrate in the grafting reaction graft copolymers D according to the invention are understood as also including products which are obtained through (co)polymerization of the graft monomers in the presence of the graft substrate and co-obtained during workup. These products may accordingly also comprise free (co)polymer of the graft monomers, i.e. (co)polymer not chemically bonded to the rubber.

A silicone-acrylate composite rubber or a mixture of different silicone-acrylate composite rubbers is employed as the graft substrate D.2. These silicone-acrylate composite rubbers are preferably composite rubbers having graft-active sites containing:

D.2.1) 5 wt. %-95 wt. %, preferably 20 wt. % to 80 wt. %, particularly preferably 25 wt. % to 50 wt. %, of silicone rubber proportion, and D.2.2) 95 wt. % to 5 wt. %, preferably 80 wt. % to 20 wt. %, particularly preferably 75 wt. % to 50 wt. %, of polyalkyl (meth)acrylate rubber proportion, wherein the two rubber components penetrate one another in the composite rubber and are therefore essentially inseparable.

The particularly preferred proportions of silicone rubber and polyalkyl (meth)acrylate rubber results in a particularly advantageous combination of good mechanical properties, good surface of the component parts and good resistance toward hydrolytic molecular weight degradation and the influence of chemicals.

Silicone-acrylate composite rubbers are known and are described for example in U.S. Pat. No. 5,807,914, EP 430134 and U.S. Pat. No. 4,888,388.

Suitable silicone rubber components D.2.1 of the silicone-acrylate composite rubbers are silicone rubbers having graft-active sites, the production method therefor is described for example in U.S. Pat. Nos. 2,891,920, 3,294,725, DE-A 3 631 540, EP 249964, EP 430134 and U.S. Pat. No. 4,888,388.

The silicone rubber according to D.2.1 is preferably produced by emulsion polymerization in which siloxane monomer units, crosslinking or branching agents and optionally grafting agents are used.

Examples of preferably siloxane monomer for production of silicone rubber include dimethylsiloxane or cyclic organosiloxanes having at least 3 ring members, preferably 3 to 6 ring members, for example and with preference hexamethylcyclotrisiloxane, octamethylcyclotetrasiloxane, decamethylcyclopentasiloxane, dodecamethylcyclohexasiloxane, trimethyltriphenylcyclotrisiloxanes, tetramethyltetraphenylcyclotetrasiloxanes, octaphenylcyclotetrasiloxane.

The organosiloxane monomers may be used alone or in the form of a mixture comprising 2 or more monomers.

Preferably crosslinking agents are silane-based crosslinking agents having a functionality of 3 or 4, particularly preferably 4. Preferred examples include: trimethoxymethylsilane, triethoxyphenylsilane, tetramethoxysilane, tetraethoxysilane, tetra-n-propoxysilane and tetrabutoxysilane. The crosslinking agent can be used alone or in a mixture of two or more. Particular preference is given to tetraethoxysilane.

Examples of grafting agents include β-methacryloyloxyethyl dimethoxymethylsilane, γ-ethacryloyloxypropyl methoxydimethylsilane, γ-methacryloyloxypropyl dimethoxymethylsilane, γ-methacryloyloxypropyl trimethoxysilane, γ-methacryloyloxypropyl ethoxydiethylsilane, γ-methacryloyloxypropyl diethoxymethylsilane, δ-methacryloyloxybutyl diethoxymethylsilane or mixtures thereof.

It is preferable to use 0-20 wt. % of grafting agent based on the total weight of the silicone rubber.

The silicone rubber may be produced by emulsion polymerization as described for example in U.S. Pat. Nos. 2,891,920 and 3,294,725.

Suitable polyalkyl(meth)acrylate rubber components D.2.2 of the silicone-acrylate-composite rubbers may be produced from alkyl methacrylates and/or alkyl acrylates, a crosslinking agent and a grafting agent.

Examples of preferred alkyl methacrylates and/or alkyl acrylates include the C1- to C8-alkyl esters, for example methyl, ethyl, n-butyl, t-butyl, n-propyl, n-hexyl, n-octyl, n-lauryl and 2-ethylhexyl esters; haloalkyl esters, preferably halo-C1-C8-alkyl esters, such as chloroethyl acrylate, and mixtures of these monomers. Particular preference is given to n-butyl acrylate.

Employable crosslinking agents for the polyalkyl(meth)acrylate rubber component of the silicone-acrylate rubber include monomers having more than one polymerizable double bond. Preferred examples of crosslinking monomers are esters of unsaturated monocarboxylic acids having 3 to 8 carbon atoms and unsaturated monohydric alcohols having 3 to 12 carbon atoms or saturated polyols having 2 to 4 OH groups and 2 to 20 carbon atoms, such as ethylene glycol dimethacrylate, propylene glycol dimethacrylate, 1,3-butylene glycol dimethacrylate and 1,4-butylene glycol dimethacrylate. The crosslinking agents can be used alone or in mixtures of at least two crosslinking agents.

Examples of preferred grafting agents include allyl methacrylate, triallyl cyanurate, triallyl isocyanurate or mixtures thereof. Allyl methacrylate may also be used as the crosslinking agent. The grafting agents can be used alone or in mixtures of at least two grafting agents.

The amount of crosslinking agent and grafting agent is 0.1 wt. % to 20 wt. % based on the total weight of the polyalkyl(meth)acrylate rubber component of the silicone-acrylate rubber.

The silicone-acrylate-composite rubber is produced by first producing the silicone rubber of D.2.1 in the form of an aqueous latex. This latex is then enriched with the alkyl methacrylates and/or alkyl acrylates to be used, the crosslinking agent and the grafting agent and a polymerization is performed.

The silicone-acrylate composite graft rubbers are produced by grafting the monomers D.1 onto the rubber substrate D.2. This can be carried out using the polymerization methods described in EP 249964, EP430134 and U.S. Pat. No. 4,888,388 for example.

As silicone-acrylate rubber, mention can be made of silicone-$C_1$-$C_8$ alkyl acrylate rubber. In particle, silicone-butylacrylate rubber can be mentioned as an example.

Preferably, the silicone-acrylate rubber based impact modifier is selected from (meth)acrylic acid ($C_1$-$C_8$)-alkyl ester-grafted silicone-$C_1$-$C_8$ alkyl acrylate rubber.

More preferably, the silicone-acrylate rubber based impact modifier is a methyl methacrylate-grafted silicone-butyl acrylate rubber.

As an example of commercially available silicone-acrylate rubber based impact modifier can be used in the present invention, mention can be made of Metablen S-2001, Metablen S-2030, and Metablen® S2130 from Mitsubishi Rayon Co., Ltd.

In a preferred embodiment, methyl methacrylate-grafted silicone-butyl acrylate rubber e.g. Metablen® S2130 are used as component D.

Advantageously, the silicone-acrylate rubber based impact modifier is present in the polycarbonate composition in an amount ranging from 1 wt. % to 4.5 wt. %, preferably from 1 wt. % to 3 wt. %, relative to the total weight of the polycarbonate composition.

Component E

According to the first aspect, the polycarbonate composition according to the present invention comprises kaolin as component E.

Kaolin is a white burning aluminum silicate that has a high fusion point and is refractory. It comprises mainly kaolinite [$Al_2O_3 \cdot 2SiO_2 \cdot 2H_2O$].

Preferably, kaolin used according to the present invention is untreated kaolin. Untreated kaolin generally has layered sheet-like structures, due in part to the presence of rings of tetrahedrons linked by oxygen atoms and shared with other rings in a two dimensional plane. Layers of cations connect the sheet-like structures. These layers of cations that connect the sheet-like structures are hereinafter referred to as interlayers. The cations are weakly bonded and are surrounded by neutral molecules, such as water molecules. The distance between the layers of sheet-like structures is referred to as the "d-spacing." The silicon to oxygen ratio in the untreated kaolin is generally from about 1:1 to about 2.5:1. Layered kaolin improves the flame-retardancy properties of the overall polycarbonate composition. This layered structure generally corresponds to particle size as well; particles with a median size of from about 1.0 to about 1.3 microns have a layered structure.

For the purpose of the present invention, preferably, kaolin used has a median particle size of from about 0.01 micron to about 2.0 microns.

In some embodiments, kaolin used has a median particle size of from about 0.4 micron to about 1.3 microns. It was found that particle sizes near the low end of this range appear to maintain the ductility of the polycarbonate composition, whereas particle sizes near the high end of this range improve the flame-retardancy properties of the polycarbonate composition better than those sizes at the low end of the range.

As a commercial product of kaolin, mention can be made of POLYFIL™ HG90 from KaMin LLC, which has a median particle size of 0.4 microns.

Advantageously, kaolin is present in the polycarbonate composition in an amount ranging from 0.5 wt. % to 3 wt. %, preferably from 0.5 wt. % to 2 wt. %, preferably from 0.5 wt. % to 1.5 wt. %, relative to the total weight of the polycarbonate composition.

It was found that when kaolin is present in the polycarbonate composition in an amount ranging from 0.5 wt. % to 1.5 wt. %, relative to the total weight of the polycarbonate composition, the impact strength is high even at a temperature of −30° C.

According to some embodiments, the polycarbonate composition according to the present invention does not comprise any other filler in addition to kaolin.

Component F

According to the first aspect, the polycarbonate composition according to the present invention comprises at least one anti-dripping agent as component F.

Preferably, the anti-dripping agent used is selected from fluorinated polyolefins.

The fluorinated polyolefins are known (see "Vinyl and Related Polymers" by Schildknecht, John Wiley & Sons, Inc., New York, 1962, pages 484-494; "Fluoropolymers" by Wall, Wiley-Interscience, John Wiley & Sons, Inc., New York, Volume 13, 1970, pages 623-654; "Modern Plastics Encyclopedia", 1970-1971, Volume 47, No. 10 A, October 1970, McGraw-Hill, Inc., New York, pages 134 and 774; "Modern Plastics Encyclopaedia", 1975-1976, October 1975, Volume 52, No. 10 A, McGraw-Hill, Inc., New York, pages 27, 28 and 472 and U.S. Pat. Nos. 3,671,487, 3,723,373 and 3,838,092).

Preferably, the anti-dripping agent is selected from polytetrafluoroethylene, polyvinylidene fluoride, tetrafluoroethylene/hexafluoropropylene copolymer and ethylene/tetrafluoroethylene copolymer.

More preferably, the anti-dripping agent used is polytetrafluoroethylene (PTFE).

Polytetrafluoroethylene can be prepared by known processes, for example by polymerization of tetrafluoroethylene in an aqueous medium with a free radical-forming catalyst, for example sodium, potassium or ammonium peroxodisulfate, at pressures of from 7 kg/cm$^2$ to 71 kg/cm$^2$ and at temperatures of from 0° C. to 200 CC, preferably at temperatures of from 20 to 100° C., for further details see e.g. U.S. Pat. No. 2,393,967.

Preferably, the fluorinated polyolefins have a high molecular weight and have glass transition temperatures of over −30° C., generally over 100° C., fluorine contents of preferably from 65 wt. % to 76 wt. %, in particular from 70 wt. % to 76 wt. % (with the fluorinated polyolefins as 100 wt. %), mean particle diameters $d_{50}$ of from 0.05 µm to 1,000 µm, preferably from 0.08 to 20 µm.

Preferably, the fluorinated polyolefins have a density of from 1.2 g/cm$^3$ to 2.3 g/cm$^3$.

More preferably, the fluorinated polyolefins used according to the invention have mean particle diameters of from 0.05 µm to 20 µm, preferably from 0.08 µm to 10 µm, and density of from 1.2 g/cm$^3$ to 1.9 g/cm$^3$.

Suitable fluorinated polyolefins which can be used in powder form are tetrafluoroethylene polymers (PTFEs) having mean particle diameters of from 100 to 1000 µm and densities of from 2.0 g/cm$^3$ to 2.3 g/cm$^3$.

PTFE can be used alone or as a masterbatch with a ho copolymer or copolymer of styrene or methyl methacrylate.

As an example of commercial products of polytetrafluoroethylene, mention can be made to those sold under the trade name Teflon® by DuPont.

A master batch of polytetrafluoroethylene and styrene-acrylonitrile (SAN) in a weight ratio of 1:1, for example, ADS 5000 available from Chemical Innovation Co., Ltd. Thailand and POLYB FS-200 available from Han Nanotech Co., Ltd, can also be used.

Advantageously, the anti-dripping agent is present in the polycarbonate composition in an amount ranging from 0.2 wt. % to 1 wt. %, preferably from 0.3 wt. % to 1 wt. %, preferably from 0.5 wt. % to 1 wt. %, relative to the total weight of the polycarbonate composition.

Component G

According to the first aspect, the polycarbonate composition according to the present invention comprises at least one UV absorber as component F.

The UV absorber may be an UV absorber commonly used in the field of polycarbonate materials.

Suitable UV absorbers are described, for example, in EP 1 308 084 A1, DE 102007011069 A1, and DE 10311063 A1.

Exemplary UV absorbers include hydroxybenzophenones; hydroxybenzotriazoles; hydroxybenzotriazines; cyanoacrylates; oxanilides; benzoxazinones; or the like, or combinations thereof.

Particularly suitable UV absorbers are hydroxybenzotriazoles such as 2-(3',5'-bis(1,1-dimethylbenzyl)-2'-hydroxyphenyl)benzotriazole (Tinuvin@ 234, BASF SE, Ludwigshafen), 2-(2'-hydroxy-5'-(tert-octyl)phenyl) benzotriazole (Tinuvin® 329, BASF SE, Ludwigshafen), 2-(2'-hydroxy-3'-(2-butyl)-5'-(tert-butyl)phenyl)benzotriazole (Tinuvin® 350, BASF SE, Ludwigshafen), bis(3-(2H-benzotriazolyl)-2-hy-droxy-5-tert-octyl)methane (Tinuvin® 360, BASF SE, Ludwigshafen), 2-(4,6-diphenyl-1,3,5-triazin-2-yl)-5-(hexyloxy)phenol (Tinuvin® 1577, BASF SE, Ludwigshafen), and 2,4-dihydroxybenzophenone (Chimasorb® 22, BASF SE, Ludwigshafen) and 2-hydroxy-4-(octyloxy)benzophenone (Chimasorb® 81, BASF SE, Ludwigshafen), 2-propenoic acid, 2-cyano-3,3-biphenyl, 2,2-bis [[(2-cyano-1-oxo-3,3-diphenyl-2-propenyl)oxy]methyl]-1, 3-propanediyl ester (9CI) (Uvinul® 3030, BASF SE, Ludwigshafen), hydroxybenzotriazines such as 242-hydroxy-4-(2-ethylhexyl)oxy]phenyl-4,6-di(4-phenyl)phenyl-1,3,5-triazine (Tinuvin® 1600, BASF SE, Ludwigshafen) or tetraethyl 2,2'-(1,4-phenylenedimethylidene)bismalonate (Hostavin® B-Cap, Clariant AG). Mixtures of these UV absorbers can also be used.

Advantageously, the UV absorber is present in the polycarbonate composition in an amount ranging from 0.2 wt. % to 0.8 wt. %, preferably from 0.25 wt. % to 0.6 wt. %, more preferably from 0.3 wt. % to 0.5 wt. %, relative to the total weight of the polycarbonate composition.

Additional Additives

In addition to components A-G mentioned above, the polycarbonate composition according to the present invention can optionally comprise a balance amount of one or more additional additives conventionally used in polymer compositions, such as lubricants and demoulding agents (e.g. pentaerythritol tetrastearate), antioxidants, antistatic agents (including inorganic antistatic agents, such as, conductive carbon blacks, carbon fibres, carbon nanotubes and organic antistatic agents, such as, polyalkylene ethers, alkylsulfonates or polyamide-containing polymers), dyestuffs, pigments, etc.

As antioxidants, it is preferable to use sterically hindered phenols and phosphites or mixtures thereof, e.g. Irganox® B900 (Ciba Speciality Chemicals).

The skilled in the art can select the type and the amount of the additional additives so as to not significantly adversely affect the desired properties of the polycarbonate composition according to the present invention.

In some embodiments, the polycarbonate composition according to the present invention consists of components A-G, a demoulding agent and an antioxidant.

In some embodiments, the polycarbonate composition according to the present invention comprising the following components, relative to the total weight of the composition:

A) 35-66 wt. % of at least one aromatic polycarbonate has an weight-average molecular weight of 23,000 to 28,000 g/mol, B) 25-56 wt. % of at least one polysiloxane-polycarbonate copolymer, C) 1.5-4.5 wt. % of at least one cyclic phosphazene, D) 1-4 wt. % of (meth)acrylic acid ($C_1$-$C_8$)-alkyl ester-grafted silicone-$C_1$-$C_8$ alkyl acrylate rubber, E) 0.5-1.5 wt % of kaolin, F) 0.5-1 wt. % of at least one anti-dripping agent, and G) 0.25-0.6 wt. % of at least one UV absorber.

Preparation of the Polycarbonate Composition

The polycarbonate composition according to the present invention can be in the form of, for example, pellets, and can be prepared by a variety of methods involving intimate admixing of the materials desired in the composition.

For example, the materials desired in the composition are first blended in a high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets can be one-fourth inch long or less as described. Such pellets can be used for subsequent molding, shaping or forming.

Melt blending methods are preferred due to the availability of melt blending equipment in commercial polymer processing facilities.

Illustrative examples of equipment used in such melt processing methods include: co-rotating and counter-rotating extruders, single screw extruders, co-kneaders, and various other types of extrusion equipment.

The temperature of the melt in the processing is preferably minimized in order to avoid excessive degradation of the polymers. It is often desirable to maintain the melt temperature between 200° C. and 330° C. in the molten resin composition, although higher temperatures can be used provided that the residence time of the resin in the processing equipment is kept short.

In some cases, the melting composition exits from a processing equipment such as an extruder through small exit holes in a die. The resulting strands of the molten resin are cooled by passing the strands through a water bath. The cooled strands can be chopped into small pellets for packaging and further handling.

Shaped Articles

The thermoplastic resin composition according to the present invention can be used, for example for the production of various types of shaped articles.

According to the second aspect, the present invention provides a shaped article made from the polycarbonate composition according to the first aspect of the present invention.

As examples of shaped articles, mention can be made to, for example, films; profiles; all kinds of housing parts, e.g. for domestic appliances such as, TV, juice presses, coffee machines and mixers, or for office machines such as monitors, adaptor, flat screens, notebooks, printers and copiers; sheets; tubes; electrical conduits; windows, doors and other profiles for the building sector (interior and exterior applications); electrical and electronic parts such as switches, charger, plugs and sockets; and body parts or interior trim for commercial vehicles, especially for the motor vehicle sector.

In particular, the shaped article can be any of the following: interior trim for rail vehicles, ships, aeroplanes, buses and other motor vehicles, housings for electrical equipment containing small transformers, housings for information processing and transmission equipment, housings and sheathing for medical equipment, housings for safety devices, moulded parts for sanitary and bath fittings, covering grids for ventilation apertures and housings for garden tools.

Preparation of Shaped Articles

The polycarbonate composition according to the present invention can be processed into shaped articles by a variety of means such as injection moulding, extrusion moulding, blowing moulding or thermoforming to form shaped articles.

Thus, according to the third aspect, the present invention provides a process for preparing the shaped article according to the second aspect of the present invention, comprising injection moulding, extrusion moulding, blowing moulding or thermoforming the polycarbonate composition according to the first aspect of the present invention.

The Examples which follow serve to illustrate the invention in greater detail.

EXAMPLES

Materials Used

Component A

A1: a linear polycarbonate having a weight average molecular weight Mw of about 26,000 g/mol based on bisphenol A, available as Makrolon® 2600 from Covestro, Co., Ltd.

A2: a linear polycarbonate having a weight average molecular weight Mw of about 24,000 g/mol based on bisphenol A, available as Makrolon® 2400 from Covestro, Co., Ltd.

Component B

Polysiloxane-polycarbonate copolymer (SicoPC) with PDMS content of about 6.5%, available as LG Lupoy® PC 8000-05 from LG Chem Ltd.

Component C

Phenoxyphosphazene of formula (VI) with an oligomer content where k=1 of 99.9 mol %, and an oligomer content where k>2 of 0.1 mol %, available as HPCTP from Weihai Jinwei Chem Induxtry Company;

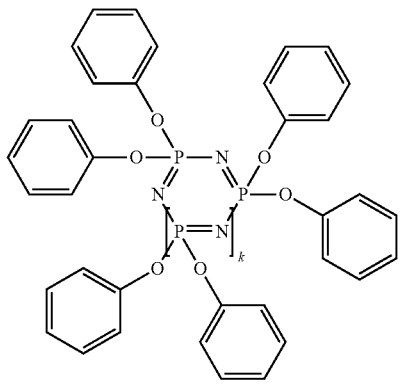

(VI)

Component D

D1: methyl methacrylate-grafted silicon-butylacrylate rubber with a core/shell structure, available as Metablen® S2130 from Mitsubishi Rayon Co., Ltd.

D2: methyl methacrylate-butadiene-styrene (MBS) with a core/shell structure, available as Kane Ace M732 from Japan Kaneka Chemical Co. Ltd.

Component E

E1: Kaolin, available as POLYFIL™ HG90 from KaMin LLC.

E2: Wollastonite, available as NYGLOS 4W from NYCO Minerals, Inc.

Component F

A masterbatch of polytetrafluoroethylene and Styrene-Acrylonitrile (SAN) in a weight ratio of 1:1, available as ADS 5000 from IRPC Public Company Limited.

Component G 2,2'-methylene-bis(6-(2H-benzotriazol-2-yl)-4-(1,1,3,3-tetramethylbutyl)) phenol, available as UV360 from Rianlon Corporation.

Component H

H1: pentaerythritol tetrastearate (PETS), a demoulding agent, available from FACI Asia Pacific Pte Ltd. (Singapore).

H2: an antioxidant, a mixture of 80% of Irgafos® 168 (tris(2,4-ditert-butylphenyl)phosphite) and 20% of Irganox® 1076 (2,6-ditert-butyl-4-(octa-decanoxycarbonyl-ethyl)phenol, available as Irganox® B900 from BASF (China) Company Limited.

Test Methods

The physical properties of compositions obtained in the examples were tested as follows.

The notched impact strength was measured in accordance with ISO 180/1A:2000 under the energy of 5.5 J on a notched single gated specimen with dimensions of 80×10×3 mm conditioned under testing temperature for 2 hours.

The flame-retardancy was measured in accordance with UL94 5 VB on specimens with dimensions of 127×12.7×2.0 mm before and after immersion in water at 82° C. for 7 days and conditioned at 23° C. for 2 days.

The Vicat softening temperature is determined in accordance with DIN 53 460 (ISO 306: 2013) on bars of dimensions 80×10×4 mm at a heating rate of 120° C./hr.

The hydrolytic stability was assessed based on the change in Izod notched impact strength measured on 80 mm×10 mm×3 mm bars in accordance with ISO 180/IA:2000 before and after immersion in water at 82° C. for 7 days.

Comparative Examples 1-7 (CE1-CE7) and Invention Examples 1-8 (IE1-IE8)

The materials listed in Tables 1 and 2 were compounded on a twin-screw extruder (ZSK-25) (Werner and Pfleider) at a speed of rotation of 225 rpm, a throughput of 20 kg/h, and a machine temperature of 260-290° C., and pelleted.

The finished granules are processed into corresponding test specimens on an injection moulding machine with a melting temperature of 260-300° C. and a mold temperature 80° C.

The physical properties of compositions obtained were tested and the results were summarized in Tables 1 and 2.

TABLE 1

| Components | CE1 | CE2 | CE3 | CE4 | CE5 |
|---|---|---|---|---|---|
| A1(Makrolon ® 2600) | 38.5 | 37 | — | 55.5 | 57 |
| A2(Makrolon ® 2400) | — | — | 49.5 | — | — |
| B(SicoPC) | 56 | 56 | 46 | 36 | 36 |
| C(Phenoxyphosphazene) | 3 | 4.5 | 1.5 | 4.5 | 2 |
| D1(Metablen ® S2130) | 1 | 1 | 1.5 | 2.5 | — |
| D2(MBS) | — | — | — | — | 2.5 |
| E1(Kaolin) | — | — | — | — | 1 |
| F(PTFE) | 0.8 | 0.8 | 0.8 | 0.8 | 0.8 |
| G(UV360) | 0.3 | 0.3 | 0.3 | 0.3 | 0.3 |
| H1(PETS) | 0.3 | 0.3 | 0.3 | 0.3 | 0.3 |
| H2(Irganox ® B900) | 0.1 | 0.1 | 0.1 | 0.1 | 0.1 |
| Vicat softening temperature (° C.) | 133 | 129 | 137 | 131 | 137 |
| Izod notched impact strength at 23° C. (KJ/m$^2$) | 65P | 65P | 65P | 66P | 69P |
| Izod notched impact strength at −20° C. (KJ/m$^2$) | 51P | 53P | 55P | 54P | 53P |
| Izod notched impact strength at −30° C. (KJ/m$^2$) | 49P | 45P | 53P | 53P | 49P |
| 5VB Class before immersion in water | Pass | Pass | Pass | Pass | Pass |
| Izod notched impact strength at 23° C. after immersion in water at 82° C. for 7 days (KJ/m$^2$) | 54P | 52P | 60P | 61P | 61P |
| 5VB Class (2.0 mm) after immersion in water at 82° C. for 7 days | Fail | Fail | Fail | Fail | Fail |

*P stand for partial break, means ductile.

Comparative Examples 1~4 (CE1-CE4) shows that compositions not comprising kaolin cannot achieve a UL level of 5 VB at a thickness of 2.0 mm after immersion in water of 82° C. for 7 days.

Comparative Example 5 (CE5) shows that compositions comprising MBS instead of silicone-acrylate rubber based impact modifier cannot achieve a UL level of 5 VB at a thickness of 2.0 mm after immersion in water of 82° C. for 7 days.

sition were low when the content of kaolin is 7 wt. %, relative to the total weight of the composition.

Comparative Example 8 (CE8) shows that a composition comprising wollastonite instead of kaolin has low izod notched impact strength at −30° C.

|  | IE1 | IE1 | IE3 | IE4 | IE5 | IE6 | IE7 | CE6 | CE7 | CE8 |
|---|---|---|---|---|---|---|---|---|---|---|
| A1(Makrolon ® 2600) | 55 | 54.5 | 66 | — | — | — | — | 62 | 59 | 55 |
| A2(Makrolon ® 2400) | — | — | — | 49 | 39 | 37.5 | 36 | — | — | — |
| B(SicoPC) | 36 | 36 | 26 | 46 | 56 | 56 | 56 | 26 | 26 | 36 |
| C(Phenoxyphosphazene) | 4.5 | 4.5 | 3 | 1.5 | 1.5 | 3 | 4.5 | 3 | 3 | 4.5 |
| D1(Metablen ® S2130) | 2.5 | 2.5 | 2.5 | 1 | 1 | 1 | 1 | 2.5 | 2.5 | 2.5 |
| E1(Kaolin) | 0.5 | 1 | 1 | 1 | 1 | 1 | 1 | 5 | 7 | — |
| E2(wollastonite) | — | — | — | — | — | — | — | — | — | 0.5 |
| F(PTFE) | 0.8 | 0.8 | 0.8 | 0.8 | 0.8 | 0.8 | 0.8 | 0.8 | 0.8 | 0.8 |
| G(UV360) | 0.3 | 0.3 | 0.3 | 0.3 | 0.3 | 0.3 | 0.3 | 0.3 | 0.3 | 0.3 |
| H1(PETS) | 0.3 | 0.3 | 0.3 | 0.3 | 0.3 | 0.3 | 0.3 | 0.3 | 0.3 | 0.3 |
| H2(Irganox ® B900) | 0.1 | 0.1 | 0.1 | 0.1 | 0.1 | 0.1 | 0.1 | 0.1 | 0.1 | 0.1 |
| Vicat softening temperature (° C.) | 129 | 129 | 133 | 137 | 137 | 132 | 128 | 133 | 134 | 130 |
| Izod notched impact strength at 23° C. (KJ/m$^2$) | 66P* | 67P | 68P | 68P | 66P | 66P | 67P | 67P | 54P | 66P |
| Izod notched impact strength at −20° C. (KJ/m$^2$) | 55P | 55P | 58P | 56P | 56P | 57P | 54P | 54P | 20C | 49P |
| Izod notched impact strength at −30° C. (KJ/m$^2$) | 53P | 51P | 51P | 52P | 53P | 52P | 48P | 24C** | 15C | 27C |
| 5VB Class before immersion in water | Pass | Pass | Pass | Pass | Pass | Pass | Pass | Pass | Pass | Pass |
| Izod notched impact strength at 23° C. after immersion in water at 82° C. for 7 days (KJ/m$^2$) | 61P | 60P | 64P | 60P | 61P | 58P | 54P | 55P | 22c | 58P |
| 5VB Class (2.0 mm) | Pass | Pass | Pass | Pass | Pass | Pass | Pass | Pass | Pass | Pass |

*P stand for partial break, means ductile.
**C stands for complete break, means brittle.

As demonstrated by Invention Examples 1-7 (IE1-IE7), compositions according to the present invention have a good combination of low-temperature impact performance, flame-retardancy, hydrolytic stability, anti-UV performance, and heat resistance.

In particular, compositions in Invention Examples 1-7 (IE1-IE7) have a vicat softening temperature of 128° C. or above, a Izod notched impact strength of 48 KJ/m$^2$ or higher at −30° C., and can achieve a UL level of 5 VB at a thickness of 2.0 mm after immersion in water of 82° C. for 7 days. The Izod notched impact strength at 23° C. can be remained after immersion in water at 82° C. for 7 days.

Comparative Example 6 (CE6) shows that the composition has high izod notched impact strength at −30° C. when the content of kaolin is 5 wt. %, relative to the total weight of the composition.

Comparative Example 7 (CE7) shows that the low-temperature (−20° C. and −30° C.) impact strength and impact strength after immersion in water for 7 days of the compo-

The invention claimed is:

1. A flame-retardant polycarbonate composition comprising the following components, relative to the total weight of the composition:

A) 30-70 wt. % of at least one aromatic polycarbonate,

B) 20-60 wt. % of at least one polysiloxane-polycarbonate copolymer,

C) 0.5-5 wt. % of at least one cyclic phosphazene,

D) 1-5 wt. % of at least one silicone-acrylate rubber based impact modifier,

E) 0.3-3 wt % of kaolin,

F) 0.1-1 wt. % of at least one anti-dripping agent, and

G) 0.1-1 wt. % of at least one UV absorber.

2. The composition according to claim 1, wherein the polysiloxane-polycarbonate copolymer comprises siloxane blocks derived from the following structure (XIII) and/or (XIV):

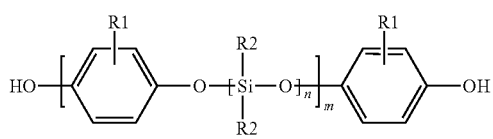

(XIII)

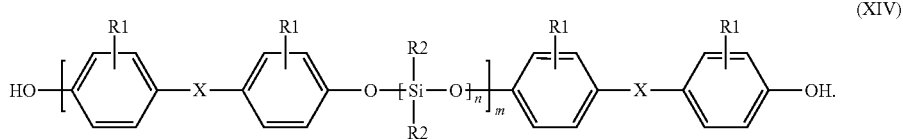

(XIV)

wherein

R1 independently of one another represents hydrogen, Cl, Br, or $C_1$-$C_4$-alkyl, R2 independently of one another represents aryl or $C_1$-$C_{13}$ alkyl, X represents a single bond, —O—, —SO—, —CO—, —S—, —$SO_2$—, $C_1$-$C_6$-alkylene, $C_2$-$C_5$-alkylidene, $C_5$-$C_{12}$-cycloalkylidene, or $C_6$-$C_{12}$-arylene which may optionally be fused to aromatic rings containing further heteroatoms, n represents an average number from 10 to 400, in each case determined by 1H-NMR spectroscopy and m represents an average number from 1 to 10, in each case determined by 1H-NMR spectroscopy.

3. The composition according to claim 1, wherein the polysiloxane-polycarbonate copolymer comprises a proportion of 2 wt. % to 20 wt. % of siloxane blocks, relative to the weight of the polysiloxane-polycarbonate copolymer.

4. The composition according to claim 1, wherein the cyclic phosphazene is selected from cyclic phosphazenes of formula (V):

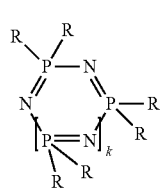

(V)

wherein k is an integer from 1 to 10, the trimer content (k=1) of from 60 to 100 mol %, based on component C), and wherein R is in each case identical or different and represents
an amine radical,
$C_1$-$C_8$-alkyl, in each case optionally halogenated,
$C_1$-$C_8$-alkoxy,
$C_5$-$C_6$-cycloalkyl in each case optionally substituted by alkyl,
$C_6$-$C_2$O-aryloxy, in each case optionally substituted by alkyl,
$C_7$-$C_{12}$-aralkyl, in each case optionally substituted by alkyl, and/or halogen,
a halogen radical, or
an OH radical.

5. The composition according to claim 4, wherein the cyclic phosphazene is selected from the group consisting of propoxyphosphazene, phenoxyphosphazene, methylphenoxyphosphazene, aminophosphazene, and fluoroalkylphosphazene.

6. The composition according to claim 1, wherein the silicone-acrylate rubber based impact modifier comprises,
D.1) 5 wt. % to 95 wt. %, of at least one vinyl monomer on
D.2) 95 wt. % to 5 wt. %, of one or more silicone-acrylate rubbers as a graft base, and wherein
wt. % is calculated based on the weight of the impact modifier.

7. The composition according to claim 6, wherein the vinyl monomer D.1 is selected from vinylaromatics, vinylaromatics substituted on the nucleus, vinyl cyanides, (meth)acrylic acid ($C_1$-$C_8$)-alkyl esters, and derivatives of unsaturated carboxylic acids, and
the silicone-acrylate rubber D.2 is selected from composite rubbers having graft-active sites containing 5 wt. %-95 wt. %, of silicone rubber proportion and 95 wt. % to 5 wt. %, of polyalkyl (meth)acrylate rubber proportion, relative to the total weight of the composite rubber.

8. The composition according to claim 1, wherein the silicone-acrylate rubber based impact modifier is a methyl methacrylate-grafted silicone-butyl acrylate rubber.

9. The composition according to claim 1 comprising the following components, relative to the total weight of the composition:
A) 35-66 wt. % of at least one aromatic polycarbonate having a weight-average molecular weight of 23,000 to 28,000 g/mol,
B) 25-56 wt. % of at least one polysiloxane-polycarbonate copolymer,
C) 1.5-4.5 wt. % of at least one cyclic phosphazene,
D) 1-4 wt. % of (meth)acrylic acid ($C_1$-$C_8$)-alkyl ester-grafted silicone-$C_1$-$C_8$ alkyl acrylate rubber,
E) 0.5-1.5 wt % of kaolin,
F) 0.5-1 wt. % of at least one anti-dripping agent, and
G) 0.25-0.6 wt. % of at least one UV absorber.

10. The composition according to claim 1, wherein the anti-dripping agent is selected from fluorinated polyolefins.

11. The composition according to claim 1, further comprising one or more additional additives selected from the group consisting of lubricants and demoulding agents, antioxidants, antistatic agents, dyestuffs, and pigments.

12. A shaped article produced from the composition according to claim 1.

13. A process for preparing a shaped article comprising injection moulding, extrusion moulding, blowing moulding or thermoforming the polycarbonate composition according to claim 1.

* * * * *